March 30, 1965  J. S. HOLLINGS ETAL  3,175,576
VALVE ASSEMBLY
Filed Nov. 26, 1962
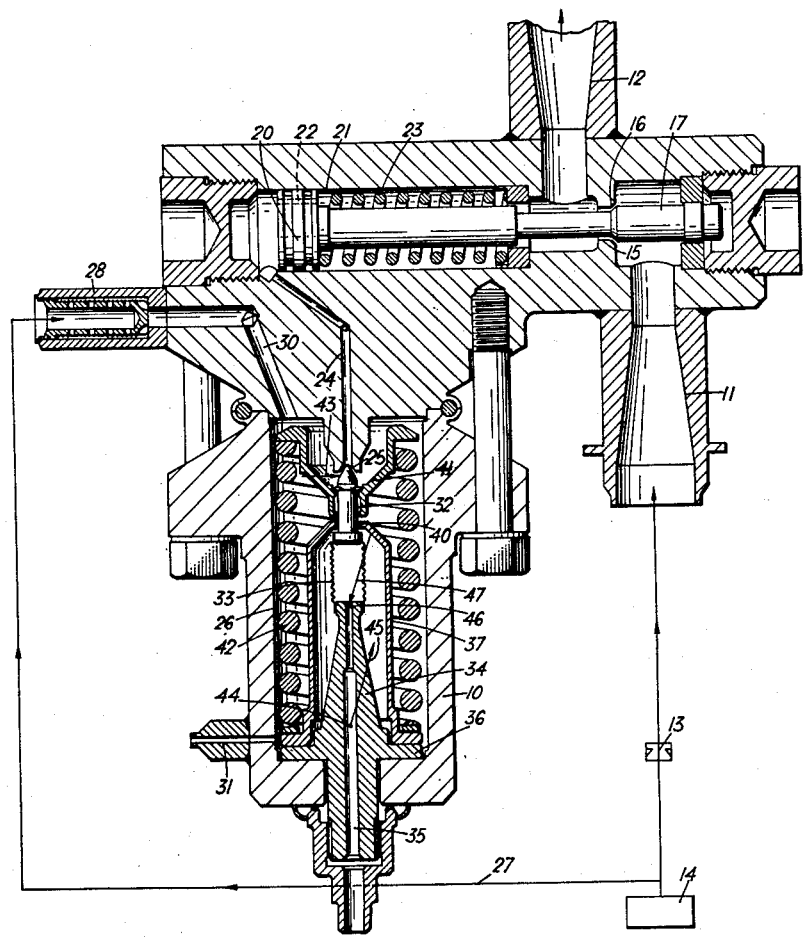
Inventors
John Shaw Hollings
George William Moore
By
Fred E. Shoemaker
Fred L. Witherspoon, Jr. Attorneys

3,175,576
VALVE ASSEMBLY
John S. Hollings, Thurso Caithness, Scotland, and George William Moore, Allestree, England, assignors to Rolls-Royce and Associates Limited, Derby, England, a company of Great Britain
Filed Nov. 26, 1962, Ser. No. 247,782
Claims priority, application Great Britain, Nov. 30, 1961, 42,972/61
4 Claims. (Cl. 137—510)

This invention concerns a valve assembly.

According to the present invention in its broadest aspect there is provided a valve assembly comprising a fixed valve seat, a floating valve member which is movable into and out of a position in which it is seated on the valve seat, and a plurality of resiliently deformable members by means of which the valve member is connected to fixed structure, the construction being such that if the valve member is subjected to a given force which tends to displace the axis of the valve member from that of the valve seat, the resiliently deformable members will subject the valve member to forces whose resultant will act in a direction opposite to that of the said given force, whereby the axes of the valve seat and the valve member will always tend to remain in alignment.

The phrase "floating valve member" as used in this specification is intended to indicate that the valve member is not aligned with the valve seat by virtue of being mounted within (or being connected to a member mounted within) a bearing. Thus the present invention provides a construction in which the friction which otherwise necessarily occurs at the said bearing is avoided.

Preferably at least one of the resiliently deformable members urges the valve member towards a position in which it is seated on the valve seat.

Means are preferably provided for subjecting the valve member to fluid pressure acting in a valve opening direction.

In the preferred form of the present invention, there is provided a valve assembly comprising a fixed valve seat, a floating valve member which is connected to fixed structure by means of a coil spring, the coil spring urging the valve member towards a seated position on the valve seat, a bellows, opposite ends of which are respectively connected to the fixed structure and to the valve member, the coil spring, and the bellows being concentrically arranged with respect to each other, and means for moving the valve member in a valve opening direction, the construction being such that if the valve member is subjected to a given force which tends to displace the axis of the valve member from that of the valve seat, the coil spring and the bellows will subject the valve member to forces whose resultant will act in a direction opposite to that of the said given force, whereby the axes of the valve seat and the valve member will always tend to remain in alignment.

The interior of the said bellows is preferably open to the atmosphere.

Preferably the coil spring, the bellows and the valve member are disposed within a common chamber which communicates with a passage by way of the said valve seat, the chamber also communicating with a fluid pressure duct through which a pressure fluid may be admitted to the chamber to act on the valve member in a valve opening direction.

The said valve member preferably constitutes a servo valve whose position controls flow of a fluid to operate a main valve.

The said main valve is preferably disposed in a main pressure fluid conduit having a restriction therein upstream of the main valve, a servo pressure conduit communicating with the main conduit upstream of the said restriction, said servo pressure conduit being adapted to supply pressure fluid to act on the valve member in a valve opening direction. It will be appreciated that, since the servo pressure conduit communicates with the main conduit upstream of the said restriction, the pressure changes which will occur in the main conduit, downstream of the restriction, on the opening of the main valve will not affect the pressure in the servo pressure conduit and therefore will not affect the pressure acting on the said valve member.

The said main valve may control a flow of cooling water from a nuclear reactor to a low pressure source.

The invention is illustrated, merely by way of example, in the accompanying drawing which is a sectional view of a valve assembly according to the present invention.

The terms "left," "right," "upwardly" and "downwardly" as used in this specification are to be understood to refer to directions as seen in the drawing.

Referring to the drawing, a valve assembly comprises a valve body 10 having pressure fluid conduits 11, 12 therein. The conduit 11, which contains a restriction 13, is adapted to be supplied with high pressure cooling water from a nuclear reactor 14.

The conduits 11, 12 are adapted to communicate with each other by way of a passage 15 provided with a valve seat 16 which forms part of a main valve. The conduit 12 leads to a low pressure source such, for example, as the sea. A valve member 17 is adapted to cooperate with the valve seat 16 so as to control the flow of cooling water from the conduit 11 to the conduit 12.

The valve member 17 is connected to a piston 20, the piston 20 being slidably mounted in a cylinder 21 formed in the valve body 10. The piston 20, which has a drilling 22 threthrough, is acted on by a spring 23. The spring 23 urges the piston 20 towards the left, i.e. in a direction to effect closure of the valve member 17.

The left hand side of the piston 20 communicates with a passage 24. The passage 24 communicates, by way of a valve seat 25, with a chamber 26 which is formed in the valve body 10. The valve seat 25 forms part of a servo valve.

A conduit 27, which communicates with the conduit 11 upstream of the restriction 13, communicates by way of a filter 28 with a duct 30 leading to the chamber 26. The chamber 26 may thus be filled with high pressure water from the conduit 11, an air vent 31 (which may be opened or closed by means not shown) permitting air to be vented from the chamber 26 when the latter is so filled.

A valve member 32 is adapted to be moved into and out of a seated position on the valve seat 25 in which it respectively prevents and permits communication between the duct 30 and passage 24.

The valve member 32 is mounted at one end of a bellows 33 whose other end is secured to one end of a fixed boss 34 which is mounted within the chamber 26, the said one end of the bellows 33 being substantially closer to the valve seat 25 than is the other end thereof. The interior of the bellows 33 is open to the atmosphere by way of a passage 35 formed in the boss 34.

The boss 34 has a flange 36 to which is secured a member 37, the bellows 33 being freely mounted within the member 37. The member 37 is substantially cylindrical but is formed with openings (not shown) to permit the pressure in the chamber 26 to act on the bellows 33. The member 37 is formed with an opening 40 through which the valve member 32 extends with an annular gap therebetween.

The valve member 32 is secured to a spring plate 41 against which acts a coil spring 42 which also acts against a part of the member 37 and hence against the flange 36. The end of the boss 34, to which the bellows 33 is connected, is substantially closer to the valve seat 25 than is the part of the member 37 against which the spring 42 acts. The bellows 33, whose axial length is less than half that of the spring 42, is mounted wholly within and is concentric with the spring 42. The spring urges the valve member 32 towards the valve seat 25. The member 37 safeguards the bellows 33 from being overstretched by the spring 42 during assembly.

In operation, when the pressure in the conduit 11, upstream of the restriction 13, exceeds a predetermined value, the said pressure acts on the valve member 32 and bellows 33 so as to move the valve member 32 away from its valve seat 25. The said pressure is therefore transmitted to the piston 20 so as to move the latter towards the right against the action of the spring 23. This moves the valve member 17 away from the valve seat 16 and permits the high pressure water to pass to the conduit 12.

The sudden opening of the valve member 17 may cause swirl and pressure variations in the conduit 11 downstream of the restriction 13. Since, however, the conduit 27 communicates with the conduit 11 upstream of the restriction 13, these pressure variations will not be transmitted to the conduit 27 and will not therefore affect the opening of the valve member 32.

When the pressure in the conduit 11 falls below the predetermined pressure, the spring 42 will effect closure of the valve member 32. The spring 23 will therefore move the piston 20 towards the left so as to close the valve member 17, water trapped behind the piston 20 passing through the drilling 22.

It will be appreciated that shock or vibration or any changes of pressure in the chamber 26, which are due to changes of pressure in the conduit 11, upstream of the restriction 13, may cause the valve member 32 to be subjected to a force which tends to displace the axis of the valve member 32 from that of the valve seat 25.

Thus the valve member 32 may, for example, be urged by the said force towards the right as indicated by the arrow 43. If, however, this occurs, the spring 42 will be twisted about a point 44 and will subject the valve member 32 and the bellows 33 to a force acting upwardly towards the right, in the direction indicated by the arrow 45. The force of the spring 42 on the bellows 33 will act on a line passing through the point 44 and through the center of the upper end of the bellows 33. At the same time, the bellows 33 will have been twisted about a point 46, and the hydraulic pressure within chamber 26 will subject the bellows 33 and hence the valve member 32 to a force acting downwardly towards the left, in the direction indicated by the arrow 47. The force of the hydraulic pressure on the bellows 33 always acts on a line passing through the point 46.

(The arrows 45, 47 are, for purposes of clarity, shown in the drawing as being disposed at relatively large angles to the axis of the valve member 32; in practice, of course, these angles would however be quite small).

The hydraulic pressure and spring force are arranged to be such that the resultant of the forces to which the bellows 33 and hence the valve member 25 are subjected by the spring 42 and by the said hydraulic pressure act towards the left, i.e. in the direction opposite to that of the arrow 43, whereby to maintain the axis of the valve member 32 in alignment with that of the valve seat 25.

The valve member 32 may thus at all times be maintained in alignment with the valve seat 25 without the need to mount the valve member 32 in a bearing.

We claim:

1. A fluid flow control valve assembly comprising a chamber provided with a fixed valve seat, a passage with which the chamber communicates by way of the said valve seat, a floating valve member which is disposed within the chamber in alignment with the axis of the valve seat, a coil spring one end of which is rigidly connected to the valve member and the other end of which is seated against a first fixed part of the chamber, the coil spring urging the valve member towards the seated position on the valve seat, a bellows one end of which is connected to the valve member and the opposite end of which is connected to a second fixed part of the chamber, the said second fixed part being substantially closer to the valve seat than the said first fixed part, and the said one end of the bellows being substantially closer to the valve seat than the said opposite end thereof, the bellows being mounted wholly within the coil spring and having an axial length which is less than half that of the coil spring, and the valve member being supported in the chamber by said coil spring and bellows, and a pressure fluid duct through which a pressure fluid may be admitted to the chamber to act on the valve member in a valve opening direction whereby, when a force tends to cause the valve to be displaced from the axis of the valve seat, the pressure within the chamber acting on the valve and bellows together with the spring force produce a restoring force to cause the valve to return to alignment with the axis of the valve seat.

2. A valve assembly as claimed in claim 1 in which the interior of the bellows is open to the atmosphere.

3. A fluid flow control valve assembly, comprising a chamber provided with a fixed valve seat, a passage with which the chamber communicates by way of the said valve seat, a floating valve member which is disposed within the chamber in alignment with the axis of the valve seat, a coiled spring one end of which is rigidly connected to the valve member, and the other end of which is seated against a first fixed part of the chamber, the coil spring urging the valve member toward the seated position on the valve seat, a bellows one end of which is connected to the valve member and the opposite end of which is connected to the second fixed part of the chamber, the said second fixed part being substantially closer to the valve seat than the said first fixed part, said bellows having an axial length which is less than half that of the coil spring, and a pressure fluid duct through which a pressure fluid may be admitted to the chamber to act on the valve member in a valve opening direction, whereby when a force tends to cause the valve to be displaced from the axis of the valve seat the pressure within the chamber acting on the valve and bellows together with the spring force will produce a restoring force to cause the valve to return to alignment with the axis of the valve seat.

4. A fluid flow control valve assembly comprising a chamber provided with a fixed valve seat, a passage with which the chamber communicates by way of the said valve seat, a floating valve member which is disposed within the chamber in alignment with the axis of the valve seat, a coil spring one end of which is rigidly connected to the valve member and the other end of which is seated against a first fixed part of the chamber, the coil spring urging the valve member toward the seated position on the valve seat, a bellows one end of which is connected to the valve member and the opposite end of which is connected to a second fixed part of the chamber, the said second fixed part being substantially closer to the valve seat than the said first fixed part, the bellows being mounted wholly within the coil spring and having an axial length which is less than half that of the coil spring, and a pressure fluid duct through which a pressure fluid may be admitted to the chamber to act on the valve member in a valve opening direction, whereby when a force tends to cause the valve to be displaced from the axis of the valve seat the pressure within the chamber acting on the valve and the bellows together with the spring force will produce a restoring force to cause the valve to return to alignment with the axis of the valve seat.

References Cited by the Examiner
UNITED STATES PATENTS

| | | | |
|---|---|---|---|
| 1,156,608 | 10/15 | Marmon | 251—61.1 XR |
| 1,916,635 | 7/33 | Pepper | 137—510 XR |
| 2,392,178 | 1/46 | Paget | 137—510 XR |
| 2,523,826 | 9/50 | Heinzelman | 137—489.5 XR |

M. CARY NELSON, *Primary Examiner.*

MARTIN P. SCHWADRON, *Examiner.*